United States Patent

Nerska

[11] 3,938,636
[45] Feb. 17, 1976

[54] SELF-ADJUSTING COVER ASSEMBLY FOR FRICTION CLUTCHES IMPROVEMENT

[75] Inventor: Karl Nerska, Seneca Falls, N.Y.

[73] Assignee: Lipe-Rollway Corporation, Syracuse, N.Y.

[22] Filed: Mar. 13, 1974

[21] Appl. No.: 450,596

[52] U.S. Cl............................................. 192/111 A
[51] Int. Cl.²......................................... F16D 13/75
[58] Field of Search................................ 192/111 A

[56] References Cited
UNITED STATES PATENTS

| | | | |
|---|---|---|---|
| 1,968,274 | 7/1934 | Wemp | 192/111 A |
| 2,040,034 | 5/1936 | Tatter | 192/111 A X |
| 2,057,803 | 10/1936 | Tatter | 192/111 A |
| 2,421,869 | 6/1947 | Brock | 192/111 A |
| 2,678,120 | 5/1954 | Binder | 192/111 A |
| 3,433,341 | 3/1969 | Bohn et al. | 192/111 A |

Primary Examiner—Benjamin W. Wyche
Attorney, Agent, or Firm—Bruns & Jenney

[57] ABSTRACT

A self-adjusting cover assembly for a friction clutch. The cover assembly includes three disc shaped members: a clutch cover, a secondary pressure plate and a primary pressure plate. Locking means, including jamming balls that releasably grip link pins, connect the primary pressure plate to the secondary pressure plate. Release lever actuated retractor means, associated with the secondary pressure plate, effect engagement and disengagement. During both the engagement and disengagement cycles the jamming balls release their hold on the link pins, thereby permitting relative axial movement between the two pressure plates. As wear occurs on the friction facings, the primary pressure plate will move axially relative to the secondary plate thereby compensating for the wear. A modification applies the principles of the invention to a cover assembly which does not include a secondary pressure plate.

6 Claims, 8 Drawing Figures

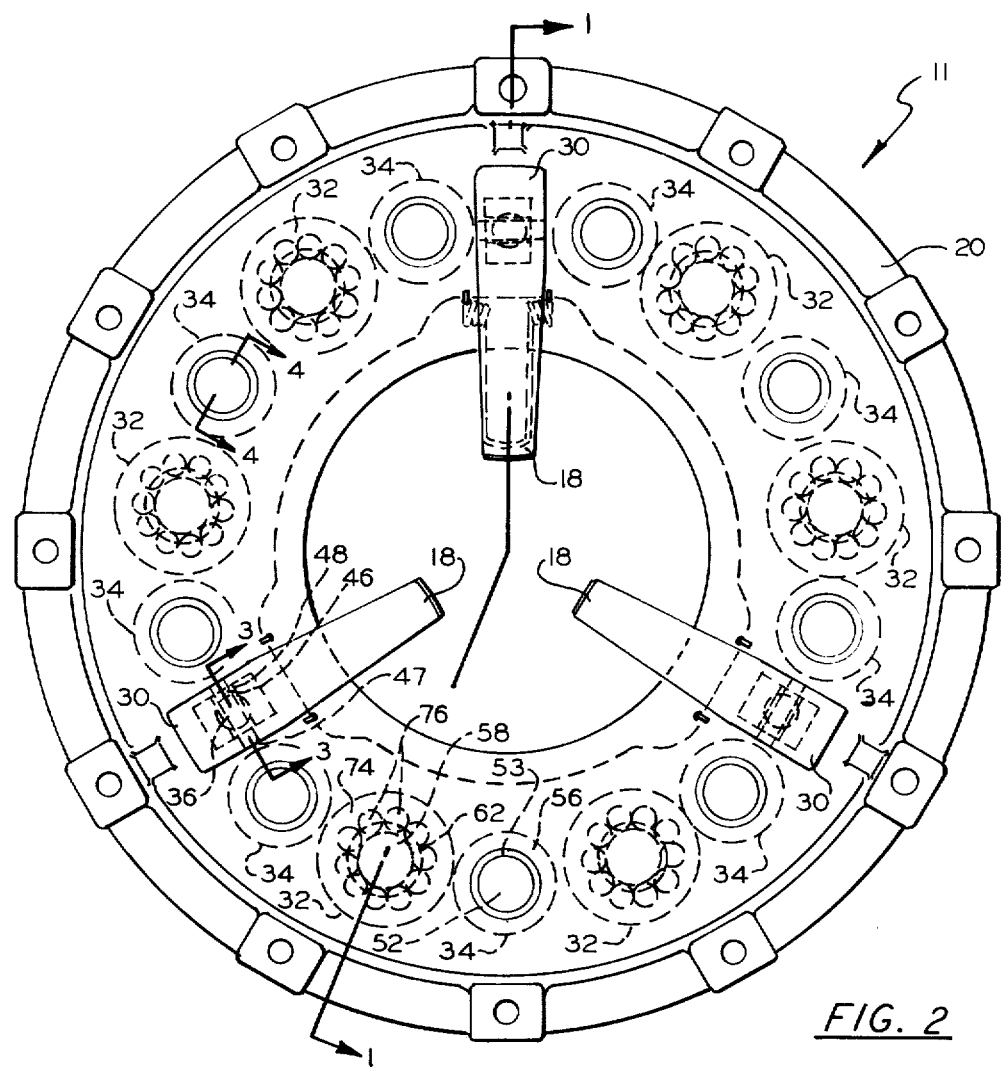
FIG. 2
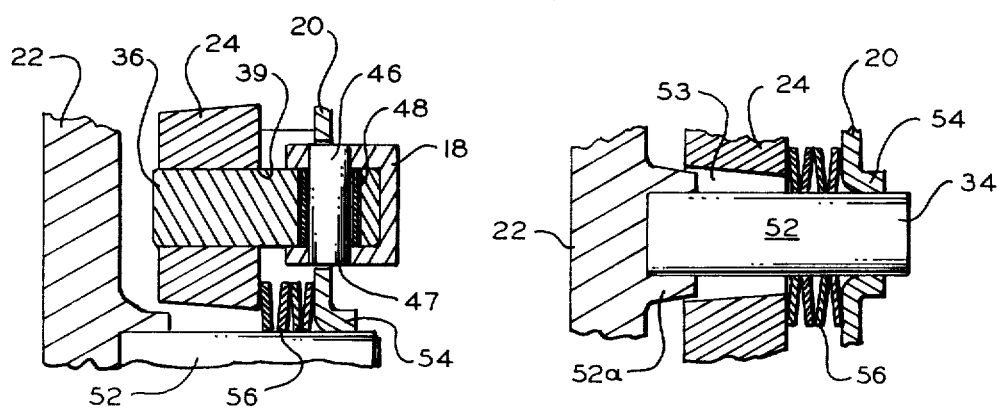
FIG. 3
FIG. 4

SELF-ADJUSTING COVER ASSEMBLY FOR FRICTION CLUTCHES IMPROVEMENT

BACKGROUND OF THE INVENTION

This invention relates generally to friction clutches, and has particular reference to a novel self-adjusting clutch cover assembly that automatically compensates for friction disc facing wear.

In friction type clutches, the driven disc or discs are disengaged from the driving flywheel and pressure plate by actuation of the release levers which are in turn actuated by axial movement of the release mechanism. Movement of the release mechanism is normally effected by a yoke member connected through a linkage to the clutch pedal of the vehicle. In engaged condition, the clutch driving and driven members are urged into engagement by pressure springs and as wear occurs on the clutch disc facings, these springs move the pressure plate closer to the flywheel.

The inward movement of the pressure plate results in a force which tends to change the normal position of the associated release levers and release mechanism and thereby to change the adjustment required for proper operation. Thus, if the free ends of the levers and the release mechanism move inwardly with the pressure plate, this may cause binding between the release bearing and yoke member or at some other point. If, on the other hand, the release mechanism is held against inward movement, binding may occur between the lever ends and spider portion of the release mechanism.

One solution to this problem has been periodic manual adjustment of the release mechanism to compensate for wear. In one type of clutch, this is accomplished by changing the angle of the yoke member. In another type, the release lever spider includes a sleeve threadedly mounted on one end of a second sleeve having the release bearing mounted on its opposite end. This permits relative axial movement between the sleeves whereby the distance between the release lever ends and yoke member can be changed to compensate for wear. A release mechanism having manual adjustment means of this last-mentioned type is disclosed in U.S. Pat. No. 2,863,537 to Root, owned by the assignee of the present invention.

Another solution to this problem has been a self-adjusting clutch release mechanism such as disclosed in U.S. Pat. No. 3,433,341 issued to Bohn et al. This construction includes a release mechanism with a collapsible or extendable release bearing carrier permitting the repositioning of the release bearing with respect to the friction discs.

Both the manual and the self-adjusting constructions compensate for the wear by repositioning the release mechanism but neither takes into consideration the gradually increasing distance between the pressure plate and the clutch cover. Thus, as the pressure plate moves axially to compensate for wear on the friction discs there is a general change in the operation of the clutch. For example, the release levers move through a changed angle resulting in a changed distance through which the yoke must be pulled for disengagement. Also, the distance through which the pressure springs must act is increased resulting in a change in torque and a change in the force needed to effect disengagement.

SUMMARY OF THE INVENTION

The self-adjusting cover assembly disclosed herein compensates for the wear on the disc facings in a manner that doesn't result in a disorientation of the release levers or an abnormal extension of the pressure springs. One embodiment of this invention includes a secondary pressure plate that is at a constant distance from the clutch cover during engagement and a self-adjusting means connecting the secondary pressure plate with the primary pressure plate.

More specifically, one cover assembly embodying the principles of this invention consists of three disc shaped members: a primary pressure plate, a secondary pressure plate and a clutch cover. Connecting the primary and secondary pressure plates are self-adjusting means including a link pin associated with the primary pressure plate, jamming balls associated with the secondary pressure plate and releasably gripping the link pin so that the two pressure plates are locked together; a retractor pin connecting the secondary pressure plate to the clutch cover and a driving pin connecting the primary pressure plate to the clutch cover.

As wear occurs on the disc facing, it is necessary for the primary pressure plate to move closer to the flywheel during engagement in order to ensure a constant pressure on the driving connection between the friction facing and the pressure plate. During both the engagement and disengagement cycles means operate to release the link pins from the grip of the jamming balls. Being free from the constraints of the release levers on the secondary pressure plate, the primary pressure plate is free to move axially towards the flywheel and thereby compensates for disc facing wear without disorienting the release levers or extending the pressure springs. After the momentary disconnection, the jamming balls again grip the link members, resulting in the two pressure plates once more functioning as a unit. A modification applies the principles of this invention to a cover assembly which does not include a secondary pressure plate.

BRIEF DESCRIPTION OF THE DRAWINGS

FIG. 2 is a rear elevation of the cover plate assembly;

FIG. 3 is a transverse section of the retractor pin connecting means taken on line 3—3 of FIG. 2;

FIG. 4 is a transverse section of the driving pin-disc spring connecting means taken on line 4—4 of FIG. 2;

DESCRIPTION OF THE PREFERRED EMBODIMENTS

Figure 1:
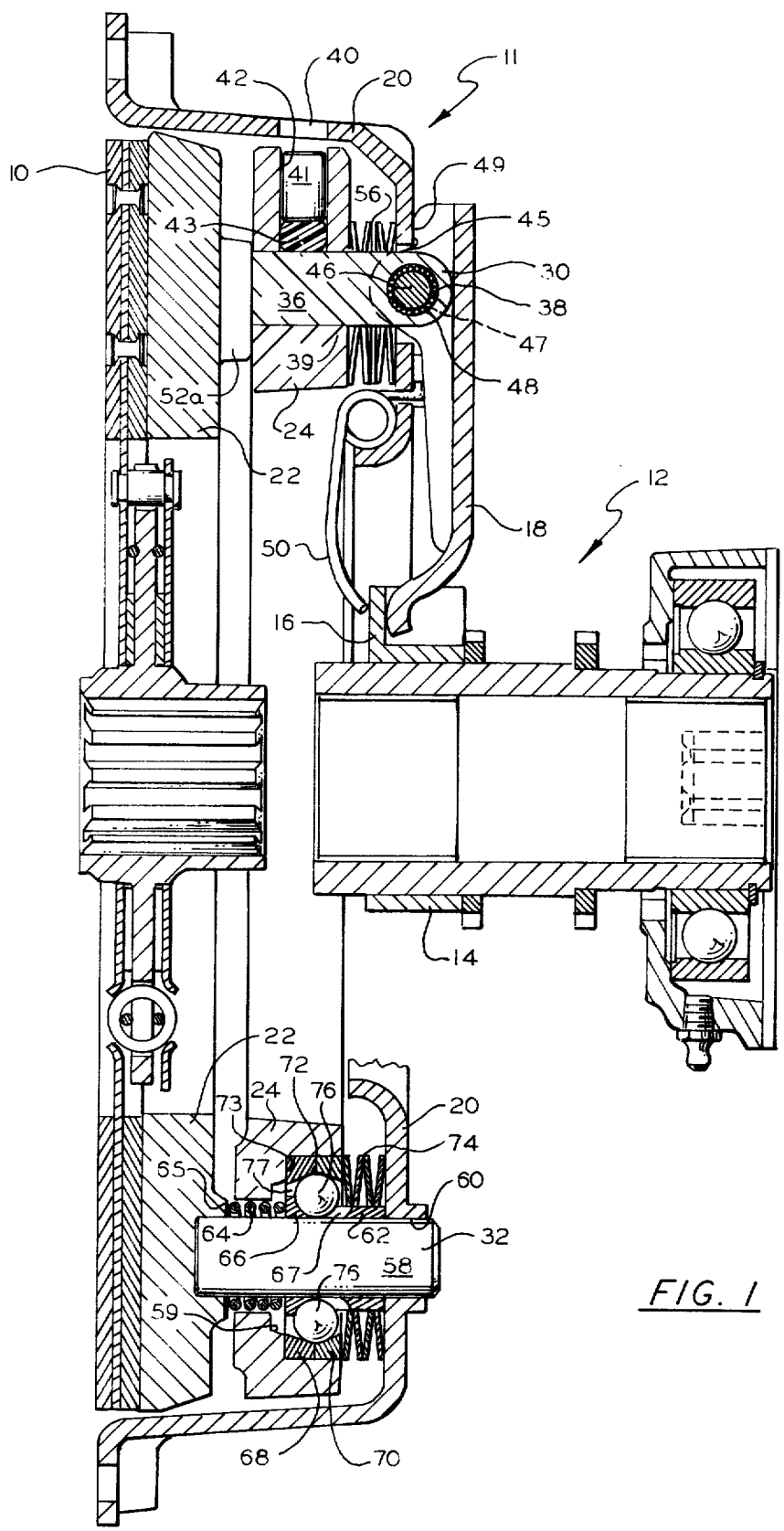
FIG. 1 is a transverse section through the cover plate assembly of the invention taken on line 1—1 of FIG. 2.

Referring now to FIG. 1, the novel self-adjusting mechanism of this invention that is shown forms a part of an otherwise conventional friction clutch such as that disclosed in Root patent 2,863,537 cited above. Accordingly, reference may be had to the Root patent for a description of the function and operation of the conventional clutch components, including the driven disc 10 on the facings of which wear occurs.

The wear compensating cover plate assembly, generally indicated by 11, is for a pull type clutch meaning that the release mechanism, generally indicated by 12, must be moved rearwardly or to the right in FIG. 1 to disengage the clutch. This movement causes the release lever spider 14, operating through lugs 16, to actuate the release levers 18 of the clutch.

The cover plate assembly in the embodiment shown in FIGS. 1 through 4 includes a clutch cover 20, a primary pressure plate 22, herein referred to as P.P.P., and a secondary pressure plate 24, herein referred to as S.P.P., plus means to connect said three members. In this preferred embodiment there are three types of connecting means: the retractor pin type 30 shown in FIGS. 1 and 3, the jammimg ball-link pin type 32 shown in FIG. 1, and the driving pin disc spring type 34 shown in FIG. 4. These three connecting means are intermixed within the cover plate assembly as shown in FIG. 2.

The retractor pin connecting means 30, FIGS. 1 and 3, between the clutch cover 20 and the S.P.P. (secondary pressure plate) 24 includes a cylindrical retractor pin 36 having a transverse bore 38 in its clutch cover end. The retractor pin's other end is received in a bore 39 of the S.P.P. 24. Because of variations in the structure of the release lever spider 14, each retractor pin 36 may penetrate the S.P.P. to a different depth. For this reason set screw means are provided for an initial adjustment.

The set screw means for each pin 36 is adjustable through a hole 40 in the clutch cover and includes a set screw 41 in a tapped hole 42 in the S.P.P. 24. This set screw forces a deformable ball 43 against the circumference of the retractor pin thereby binding the pin securely to the S.P.P. 24 and causing the pin and the S.P.P. to function as a unit. In this preferred embodiment a nylon ball is used. In the description of the operation of the invention the fact that the connection between the retractor pin 36 and the S.P.P. 24 is adjustable is irrelevant as the set screw 41 is adjusted only during initial assembly.

The outer end of the retractor pin extends through a rectangular hole 45 in the clutch cover, where it is connected to the channel shaped release lever 18 by a press fitted pin 46. This pin passes through corresponding bores 47 in the lever and the bore 38 in the retractor pin.

Encircling the press fitted pin 46 where it passes through the retractor pin 36 are ball bearings 48. The channel shaped release lever 18 has its fulcrum at point 49 on the clutch cover 20. Retractor spring 50 performs its standard function of holding the lug 16 of the release lever spider in contact with the release lever 18 while the clutch is engaged.

Although three retractor pin connecting means 30 are spaced evenly about the circumference of the cover plate assembly (as seen in FIG. 2), a greater or smaller number may be employed in other configurations.

The second type connecting means is the driving pin-disc spring type 34, as best seen in FIG. 4. Driving pin 52, press fitted into a boss 52a in the P.P.P. primary pressure plate) 22, passes through a bore 53 in the S.P.P. 24 and a boss 54 in the clutch cover 20. A series of disc springs 56, encircling the driving pin 52 are compressed between the flywheel cover 20 and S.P.P. 24. Nine connecting means of this type 34 are shown in the embodiment of FIG. 2 but greater or smaller numbers are possible as other springs of various types and strengths may be substituted for disc springs 56.

The jamming ball-link pin connecting means 32, FIG. 1, between the P.P.P. 22, the S.P.P. 24 and the clutch cover 20 includes a link pin 58 press fitted into the P.P.P. and projecting perpendicularly therefrom. Corresponding to each pin 58 are circular apertures 59 and 60 in the S.P.P. 24 and the clutch cover 20, respectively, through which the pin passes. As the pin 58 passes through the S.P.P. 24 the inner surface of aperture 59 faces the outer surface of the pin.

Encircling the link pin 58 between the flywheel cover 20 and P.P.P. 22 and passing through the S.P.P. 24 is a slidable sleeve 62 and a coil spring 64. The coil spring 64 is compressed between a boss 65 on P.P.P. 22 and a flange 66 on the sleeve 62. Around the circumference of the sleeve 62 adjacent the flange 66 are oval apertures 67. Press fitted into the aperture 59 of the S.P.P. 24 are a disengagement ring 68 and an engagement ring 70. These two tapered rings 68 and 70, when mated, form a recess with two inclined surfaces and a deepest part or apex 72 as seen in FIG. 1. The two rings 68, 70 are engaged on one side by shoulder 73 and on the other by disc springs 74. Disc springs 74, encircling the link pin sleeve 62, are compressed between the clutch cover 20 and engagement ring 70. Jamming balls 76 are retained in a cavity 77 between the tapered rings 68, 70 and the oval holes 67 in the link pin sleeve 62. These balls are dimensioned to roll when they are in the apex 72 of the recess but jam whey they are between a point on the inclined surfaces of the rings 68, 70 and the link pin 58.

Six of these jamming ball-link pin connecting means 32 are spaced about the circumference of the cover plate assembly 11 of this preferred embodiment but there may be a variation in the number and placement of the means depending on the size of the means, strength of the components, etc.

FIG. 1 shows the novel cover assembly 11 of the invention in the engaged position. In normal operation disengagement of the clutch is as follows: Release mechanism 12 is moved rearwardly (to the right in FIG. 1) by a clutch pedal actuated yoke (not shown) which engages the release mechanism. The yoke pull is transmitted through the release mechanism 12 and release lever spider 14 to lugs 16 and release levers 18.

The release levers 18 pivot on fulcrum points 49 and through pins 46 draw the retractor pins 36 rearwardly. Ball bearings 48 enable pins 46 to rotate within bores 38, thereby permitting the retractor pins 36 to move perpendicularly to the cover plate 20 even though the release levers pull the retractor pins through a non-perpendicular angle.

The rearward movement of the retractor pins is transmitted through deformed walls 43 and set screws 41 to S.P.P. 24 (secondary pressure plate). As the S.P.P. moves rearwardly, disc springs 56, FIG. 4, are compressed between the S.P.P. and the clutch cover 20. The rearward movement of the S.P.P. also acts to move the tapered rings 68 and 70, thereby compressing disc springs 74, FIG. 1.

During engagement of the clutch, the jamming balls 76 for each ball-link connecting means 32 were wedged between the inclined surface of engagement ring 70 and the outer surface of link pin 58; now, as the tapered ring moves rearwardly, the jamming balls 76 are freed.

As the apex 72 of the cavity 77 moves past the jamming balls 76, there is a short time during which the link pins 58 are able to move axially, independent of the S.P.P. 24.

During the momentary disconnection, the cavities 77 continue to move rearwardly until the jamming balls 76 for each connecting means 32 come into contact with the inclined surface of the disengagement ring 68. Continued rearward motion of the S.P.P. 24 causes the jamming balls to become wedged between the inclined surface of the disengagement ring 68 and the outer surface of the link pin 58, resulting in all further rearward movement of the S.P.P. being transferred through the disengagement rings 68, balls 76 and link pin 58 to P.P.P. 22. As pull continues on the release mechanism 12, disc springs 74 and 56 are compressed and the P.P.P. 22 is pulled out of engagement with the friction disc 10.

During the reengagement cycle the above sequence is reversed. With the release of the yoke (not shown) the release mechanism 12, and therefore the release lever actuated retractor pin means 30, no longer applies rearward force to the S.P.P. 24. Disc springs 56 and 74, no longer opposed by the yoke pull, strongly urge S.P.P. 24 and the tapered rings 68 and 70 towards the friction disc 10. Here, as in the disengagement cycle, as the apex 72 of the cavity 77 moves past the jamming balls 76, there is a short time during which the link pins 58 are able to move axially, independent of the S.P.P. 24. Coil spring 64, with one end abutting sleeve flange 66 and its other end in contact with the boss 65, biases the P.P.P. 22 towards the driven discs 10. If any wear has occurred on these disc facings the P.P.P. 22 will move forward (to the left in FIG. 1) to compensate for same. Upon contacting the friction discs, P.P.P. 22 is prevented from further axial motion; however, S.P.P. 24, not similarly restricted, is able to continue forward (to the left in FIG. 1). The jamming balls 76 continue to be rolled, by the moving tapered rings 68, 70, past the apex 72 of the cavity 77 until they become wedged between the outer surface of the link pin 58 and the inclined surface of the engagement ring 70.

In normal operation, there should be no instance where the jamming balls 76 move out of binding contact with the disengagement ring 68 before the P.P.P. 22 engages the friction disc 10. In normal use, a clutch pedal is released only as fast as a man lifts his foot. This will result in a relatively gradual application of the full force of the disc springs 56 and 74 on S.P.P. 24, while at the same time the coil springs 64 are applying their full force to the P.P.P. The full application of this lesser force will cause the P.P.P. 22 to keep pace with the S.P.P. which is being biased by a less than full application of a greater force.

Considering the worst possible case, if the clutch pedal is assumed to be released instantaneously the full application of the force of springs 56 and 74 may result in the S.P.P. 24 moving faster than the P.P.P., which at this moment is biased only by relatively weak springs 64, thereby causing the jamming balls 76 to prematurely disengage. However, by proper design, the relative strength of the coil springs 64 to the disc springs 56 and 74 can be such that the slower moving P.P.P. 22 will be able to move through its engagement distance (a maximum of .090 inches) before the more rapidly moving S.P.P. 24 moves through its longer engagement distance. The engagement distance of the S.P.P. 24 is equal to the engagement distance of the P.P.P. plus the distance through which the S.P.P. moves while the jamming balls travel between the disengagement rings 68 and the engagement rings 70.

Both, in the normal situation when the P.P.P. has been stopped by the friction disc 10 before the jamming balls are freed of the disengagement ring 68, and in the worst possible case when the jamming balls are freed while the P.P.P. 22 is still in motion, there is an interval during which the P.P.P. 22 is free to move axially, independent of the S.P.P. 24 and thereby compensate for the wear on the friction disc 10.

With the frictional binding between the outer surfaces of the link pins 58 and the inclined surfaces of the engagement rings 70, the force of disc springs 56 and 74 is transmitted from S.P.P. 24 to P.P.P. 22. Disc springs 56, FIG. 4, of the driving pin connection means 34 transfer force through the S.P.P. 24 to the press fitted engagement rings 70, while the force of disc springs 74 is applied directly to the engagement rings, FIG. 1. The force on the engagement rings 70 is transmitted through the jamming balls 76 and link pins 58 to the P.P.P. 22.

As described previously, the rate of motion during re-engagement of the two pressure plates 22, 24 can vary depending upon the rate of release of the clutch pedal. With these different rates S.P.P. 24 could be at a slightly different position during each engagement causing a disorientation of the release levers and abnormal extension of the pressure springs. Sleeves 62 limit the movement of the jamming balls 76 and ensure that the S.P.P. will never be further than a fixed distance from the clutch cover 20 during engagement.

Figure 5:
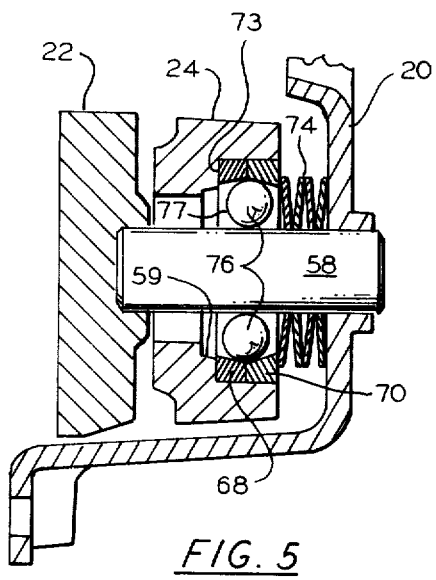
FIG. 5 s a transverse section of a modified jamming ball-link pin connecting means.
Figure 6:
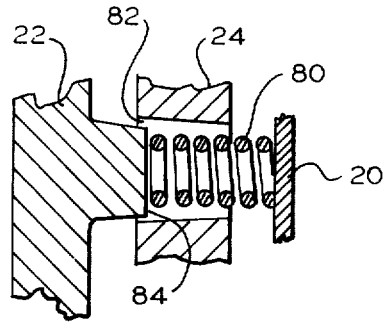
FIG. 6 is a transverse section of a pressure spring used in conjunction with the modified jamming ball-link pin connecting means of FIG. 5.

FIGS. 5 and 6 show a possible modification of the jamming ball-link pin connecting means 32 of FIG. 1 without sleeve 62. The connecting means shown in FIG. 5 is the jamming ball-link pin type connecting means 32 of FIG. 1, but with coil spring 64 and sleeve 62 omitted. FIG. 6 shows a coil spring 80 abutting clutch cover 20 at one end and passing through a bore 82 in the S.P.P. 24 to abut against a lug 84 on P.P.P. 22 at its other end.

In operation coil spring 80, replacing the omitted coil spring 64, biases the primary pressure plate 22 towards the friction disc 10. Omitted sleeve 62, abutting the clutch cover 20, had partially functioned as an extension of the clutch cover; here the longer coil spring 80 fulfills this function. The primary function of sleeve 62 in the embodiment of FIG. 1, that is to ensure that the S.P.P. 24 is never further than a fixed distance from the clutch cover 20 during engagement, is not duplicated.

The function of the driving pin-disc spring connecting means 34, FIG. 4, is two-fold. First, it provides additional pressure on S.P.P. 24, and thus on P.P.P. 22 during engagement. However, disc springs 56 would be unnecessary if the force of the disc springs 74 were increased. Second, it provides a driving connection between the clutch cover 20 and P.P.P. 22 but as is well known to those familiar with the art, other types of driving connections are possible.

Figure 7:
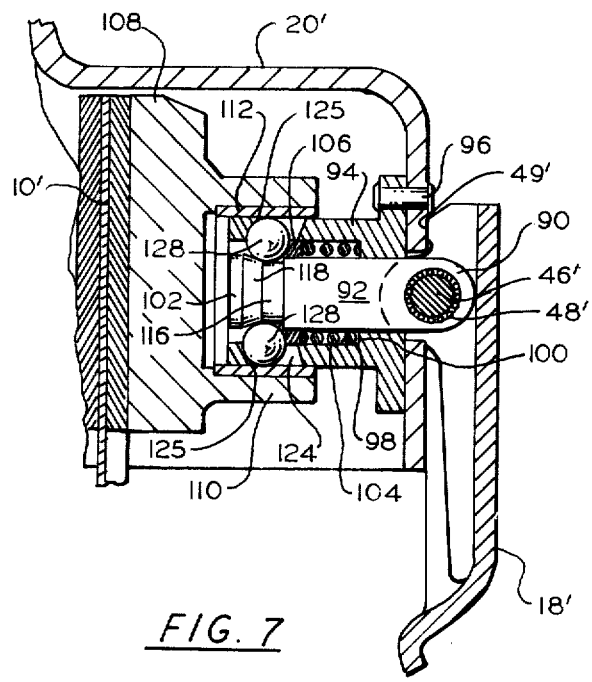
FIG. 7 is a transverse section of a combined connecting means without a secondary pressure plate.

FIG. 7 is a modification of the self-adjusting cover assembly of this invention without a secondary pressure plate. In this embodiment the functions of the jamming ball-link pin connecting means 32 and the function of the retractor pin connecting means 30 (both seen in FIG. 1) are combined in a single connecting means 90.

A retractor-link pin 92 (herein referred to as R.L.P.) combines the functions of the retractor pin 36 and link pin 58 of the connecting means 30 and 32, respectively. Connected to the release levers 18', in the manner described for retractor pin 36 of FIG. 1, R.L.P. 92 extends through clutch cover 20', as shown. A sleeve 94, secured to the clutch cover 20' by a rivet 96, is dimensioned to slidably receive R.L.P. 92 adjacent the clutch cover while providing a cavity 98 between the R.L.P. and sleeve which extends from an interior shoulder 100 to the pressure plate end 102 of the R.L.P. A coil spring 104 positioned in cavity 98 is compressed between shoulder 100 and a washer 106.

Projecting normally from the right face (as seen in FIG. 7) of pressure plate 108 is an outer cylindrical sleeve 110. An inner sleeve 112, more wear resistant than the outer sleeve 110, is press fitted into the latter. Sleeve 112 is dimensioned to slidably receive sleeve 94 therein.

Adjacent its inner end, R.L.P. 92 is formed with a circumferential groove 116. An annular, inclined disengagement surface 118 extends from the deepest part of the groove 116 to a point adjacent the inner or pressure plate end of the R.L.P. Opposite the groove 116, in sleeve 94, are a plurality of apertures 124 each having an inclined wall 125. Within cavities 126 formed by the apertures 124 and groove 116 are a series of jamming balls 128. Said balls are dimensioned to roll when they are in the deepest part of the groove 116 but jam when they are between the disengagement surface 118 and the inner surface of sleeve 94.

Figure 8:
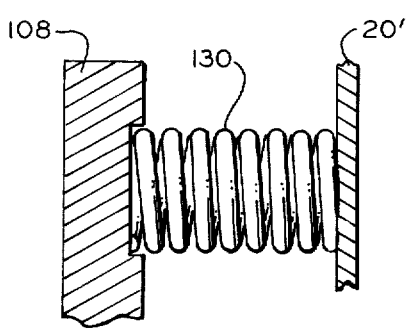
FIG. 8 is a transverse section of a pressure spring used in conjunction with the combined connecting means of FIG. 7.

FIG. 8 shows a coil spring 130 compressed between clutch cover 20' and pressure plate 108. The placement of the connecting means of FIG. 7 and the spring means of FIG. 8 will vary from clutch to clutch but one workable arrangement is the replacing of the three retractor connecting means 30 in FIG. 2 with three connecting means 90 of FIG. 7 and replacement of the nine driving pin-disc spring connecting means 34 and the six jamming bearing link pin connecting means 32 in FIG. 2 with fifteen spring means of FIG. 8.

FIG. 7 shows the modified connecting means 90 of the self-adjusting cover assembly of this invention in the engaged position. In normal operation, disengagement is initiated by the release levers 18', actuated by the pull of the yoke (not shown) as described for the cover assembly of FIG. 1. The release levers 18' pivot on fulcrum points 49' and through pins 46' draw the R.L.P.'s 92 rearwardly (to the right in FIG. 7). The function of ball bearings 48' is the same as described for FIG. 1.

When the clutch is engaged, the jamming balls 128 are in the deepest part of each pin groove 116 and are held stationary between walls 125 and washer 106 by the bias of coil spring 104. Now as the R.L.P. 92 moves rearwardly the disengagement surface 118 moves into contact with the stationary jamming balls 128. Further rearward movement of the R.L.P. causes the balls to become wedged between the disengagement surface 118 and the inner surface of sleeve 112. All further rearward movement of the R.L.P. is transmitted to pressure plate 108 through the jamming balls 128 and sleeves 112 and 110. Rearward movement of pressure plate 108 compresses coil springs 130 between the pressure plate and the clutch cover 20'.

During the reengagement cycle the above sequence is reversed. With the release of the yoke, the release levers 18 no longer apply rearward force to the R.L.P.'s 92. Coil springs 130 no longer opposed by the release levers 18 urge the pressure plate 108 forward (to the left in FIG. 7). As the pressure plate 108 moves forward the jamming balls 128 remain in the wedged position between the disengagement surface 118 of each R.L.P. 92 and the inner surface of sleeve 112 causing the R.L.P. and thus its corresponding release lever 18 to move forward.

As the jamming balls 128 are carried forward within apertures 124, they eventually come into contact with stationary walls 125. As the R.L.P.'s 92 and thus the disengagement surfaces 118, continue to move forward, the jamming balls are freed from binding contact between the disengagement surfaces 118 and outer sleeves 112. The pressure plate 108 is now free to move axially, independent of the R.L.P.'s, and pressure springs 130 continue to bias the pressure plate forward until it contacts the friction disc 10'. From the above it may be seen that as wear occurs on the friction disc the independent movement of the pressure plate 108 will compensate for this wear; however, it can also be seen that pressure springs 130 are extended through an increasing distance as the wear occurs. From this it can be seen that the modification of the self-adjusting cover assembly shown in FIGS. 7 and 8 does not provide all the advantages of the preferred embodiment of FIGS. 1–4, but it does provide a cover assembly that compensates for wear without manual intervention and without disorientation of the release levers.

From the foregoing description it will be apparent that the invention provides a novel self-adjusting cover assembly that can effectively reduce vehicle down time and maintenance costs. As will be understood by those familiar with the art, the invention may be embodied in other specific forms without departing from the spirit or essential characteristics thereof.

I claim:

1. In a friction clutch for connecting driving and driven shafts, the clutch having a release lever actuated by a release mechanism, a friction disc, a clutch cover and a pressure plate; the improvement comprising a self-adjusting means associated with the release lever and the pressure plate, said self-adjusting means including:
    a first connecting means operably connected to the release lever and having at least one facing surface, said connecting means including a secondary pressure plate, the facing surface in the connecting means being in an aperture in said secondary pressure plate;
    a second connecting means secured to the pressure plate and having at least one facing surface, at least one facing surface of said first connecting means confronting at least one facing surface of the second connecting means;
    the confronting facing surfaces being spaced from one another to define a cavity, said cavity having at least one inclined surface therein; and
    at least one jamming ball positioned in said cavity, said ball being dimensioned to roll when in one part of the cavity and to be bound between a part of said inclined surface and one of said confronting facing surfaces.

2. The clutch of claim 1 including retractor means operably connecting the release lever to the secondary pressure plate whereby axial movement of the release levers is transmitted to the secondary pressure plate.

3. The clutch of claim 1 including a first spring means between the clutch cover and the secondary pressure plate biasing said secondary pressure plate toward the pressure plate, and a second spring means associated with the clutch cover and the pressure plate and biasing the pressure plate towards the friction disc.

4. In a friction clutch for connecting driving and driven shafts, the clutch having release levers actuated by a release mechanism, a friction disc, a clutch cover and a primary pressure plate; the improvement comprising a self-adjusting means associated with the release levers and the pressure plate, said self-adjusting means including:

a secondary pressure plate having at least one facing surface;

retractor means connecting the secondary pressure plate to the release levers whereby axial movement of the release levers is transmitted to the secondary pressure plate;

first spring means between the clutch cover and the secondary pressure plate whereby the secondary pressure plate is biased towards the primary pressure plate;

second spring means associated with the clutch cover and the primary pressure plate whereby the latter is biased towards the friction disc;

connecting means associated with the primary pressure plate, said connecting means having at least one facing surface confronting at least one facing surface of the secondary pressure plate;

the confronting facing surfaces being spaced from one another to define a cavity, said cavity having two inclined surfaces therein, said inclined surfaces extending in opposite directions;

at least one jamming ball positioned in said cavity, said ball being dimensioned to roll when in one part of the cavity and to be bound between a part of each inclined surface and one of said confronting facing surfaces.

5. The clutch of claim 4 including an intermediate member extending between the confronting facing surfaces, said intermediate member having at least one aperture corresponding to the jamming ball.

6. The clutch of claim 4 including a driving means between the clutch cover and primary pressure plate.

* * * * *